May 10, 1955     S. ALLEN     2,707,965

FLOW CHECK VALVE

Filed Feb. 20, 1952

INVENTOR
SIDNEY ALLEN
By Mawhinney & Mawhinney
ATTYS.

United States Patent Office 2,707,965
Patented May 10, 1955

2,707,965

FLOW CHECK VALVE

Sidney Allen, Coventry, England, assignor to Armstrong Siddeley Motors Limited, Coventry, England Application February 20, 1952, Serial No. 272,621

6 Claims. (Cl. 137—75)

The main object of the present invention is to provide a flow check valve, to serve for connecting a source of gaseous fluid pressure at high temperature to a pressure-responsive receiver (such as an instrument, pressure switch or other equipment) which does not require a continuous flow thereto, which valve will disconnect the receiver from the source in the event of a leak occurring in the receiver, or in its connection to the valve—i. e., a leak occurring on the outlet side of the valve.

The flow check valve of the invention includes a body containing a heat-fusible member serving to hold a movable valve element, on the side of the fusible member adjacent the said source, clear of a hole in a valve seating on the other side of the fusible member, through which hole (and through a hole in the fusible member, or past the fusible member) the connection between the said source and the receiver is established; and the movable valve element is adapted to close the hole in the valve seating when the fusible member melts—as when there is a continuous flow through the check valve, through or past the fusible member, due to a leak on the outlet side of the valve.

Figure 1:
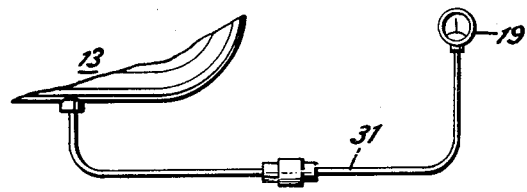
Figure 1 is a fragmentary view of a check valve, constructed according to the invention, arranged between a source of gaseous fluid at high temperature and a pressure-responsive receiver.
Figure 2:
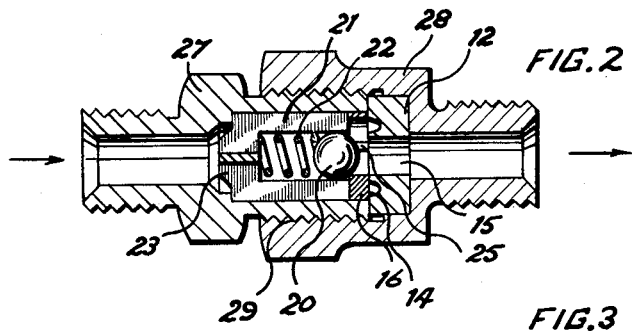
Figure 2 is a sectional elevation of the check valve.
Figure 3:
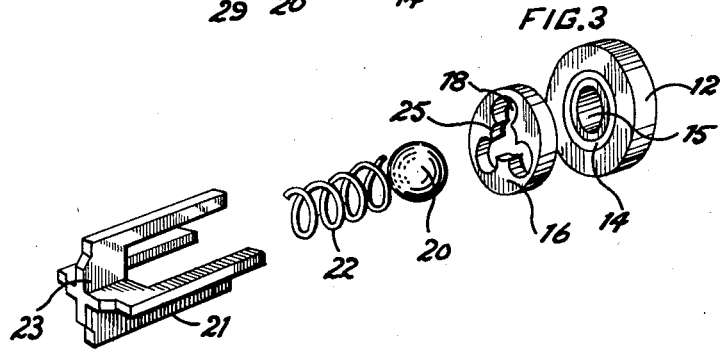
Figure 3 is a perspective view of the internal parts of the valve separated from one another.

In the construction shown, the valve seating is in the form of a separate backing plate 12 provided in its upstream face (i. e. that towards the said source 13) with an annular groove 14, concentric with its hole 15, into which some of the material of the fusible member 16 can flow when the latter melts. The fusible member, for example, a plate of soft solder, has a clover-leaf opening 18 through it which is coaxial with the hole 15 in the backing plate, this opening being at all times in connection with the hole in the backing plate whilst the fusible plate remains at a low temperature, as will be the case while there is no flow through the check valve to the receiver 19. The movable valve element 20 is conveniently a ball slidably guided by a cage 21 in the form of a four-pronged fork, with a compression spring 22 acting between the ball and the base 23 of the cage, the base being upstream of the ball. The portion 25 of the edge of the opening, in the fusible plate, which is engaged by the ball is of a sufficiently small diameter to maintain the ball well clear of the hole in the backing plate.

The parts are assembled in two body portions 27, 28 which are screwed to one another at 29.

If the receiver 19 should develop a leak, the continuous stream of hot gas through the check valve heats the fusible plate 16, and the latter on melting releases the ball and allows it to close the hole 15 in the backing plate, thus stopping the flow and preserving the receiver from damage. This applies also if the pipe 31 from the check valve to the receiver should break. The stopping of the flow also preserves the check valve from damage by the hot gases, and, what is perhaps more important, reduces the risk of the hot gases starting a fire in some adjacent part.

What I claim as my invention and desire to secure by Letters Patent of the United States is:

1. In a flow check valve for connection in a line between a source of high temperature gaseous fluid under pressure and a device acting responsively to the static pressure of the fluid and having a movable valve element which is biased toward closed position and is normally held clear of a co-acting seating, a heat fusible member in the line between the valve element and the seating for holding the valve element clear of the seating, said fusible member having an irregularly shaped bore therethrough upon peripheral portions of which the valve element partially seats until a flow of the fluid through said bore occurs and causes a resultant rise in temperature of the fluid in contact with the member to fuse the latter and allow the valve element and seating to engage sealingly.

2. A flow check valve for connection between a source of high temperature gaseous fluid under pressure and a device acting responsively to the static pressure of the fluid, said valve comprising a body having a bore therethrough, a valve seat in the bore, a valve member adapted to sealingly engage the seat, means urging the valve toward said seat, and a fusible member interposed between said valve and said seat, said fusible member having a bore therethrough against walls of which said valve seats and being of such shape that the static pressure is transmitted to said device until a flow of the fluid through said bore occurs and causes a resultant rise in temperature to fuse said fusible member and allow the valve member to sealingly engage the seat.

3. In a flow check valve for connection between a source of high temperature gaseous fluid under pressure and a device acting responsively to the static pressure of the fluid and having a movable valve element which is biased toward closed position and is normally held clear of a co-acting seating, a heat fusible member interposed between the said seating and the valve element and having a through bore larger than said valve element, said heat fusible member having at least one projection extending into the bore of the member and engaging the valve element to normally hold the valve element clear of its seating, said projection being exposed directly to the hot gaseous fluid when the fluid flows from said source towards said device, whereby the projection is melted and the valve element moves through the bore of said member and sealingly engages its seating.

4. For use in a connection between a source of hot gaseous fluid under pressure and a device responsive to the static pressure of the fluid, a flow check valve comprising a backing plate adapted to be positioned in the connection and having a through hole therein and a valve seating surrounding the hole and facing upstream, a valve element for sealingly engaging said valve seating when a leak occurs downstream of the backing plate, resilient means for urging said valve element towards the valve seating, a leaky valve seat member of heat-fusible material positioned between said backing plate and said valve element and having a valve seat for engaging the valve element to normally hold it clear of the valve seating, said valve seat member having at least one through passage for the transmission of pressure to the hole of the backing plate, said valve seat member having its entire upstream side exposed to the hot gaseous fluid as it flows through the connection from said source towards said device when a leak occurs downstream of the backing plate, whereby the heat from the hot gaseous fluid fuses the valve seat member to permit the valve element to sealingly engage the valve seating.

5. A flow check valve as claimed in claim 4 wherein an annular groove is provided in the upstream face of the backing plate concentric with the hole in the backing plate for receiving some of the fused material of the valve seat member.

6. A flow check valve for connection between a source of high temperature gaseous fluid under pressure and a device acting responsively to the static pressure of the fluid, of the kind having a movable valve element which is normally held clear of a co-acting seating by a heat-fusible member, characterized in that the heat-fusible member is interposed between the said seating and the co-acting portion of the movable valve element, said member having at least one through passage for the transmission of pressure through a bore of the seating whereby itself to act as a leaky valve seating until a flow of the fluid through said through passage occurs and causes a resultant rise in temperature to fuse said member and allow the co-acting portions of said valve element and seating to engage sealingly.

References Cited in the file of this patent

UNITED STATES PATENTS

| | | |
|---|---|---|
| 2,048,389 | Johnsen | July 21, 1936 |

FOREIGN PATENTS

| | | |
|---|---|---|
| 685,154 | France | Mar. 25, 1930 |